(12) United States Patent
Ciamarra et al.

(10) Patent No.: US 10,677,083 B2
(45) Date of Patent: Jun. 9, 2020

(54) BLADE OUTER AIR SEAL FOR A GAS TURBINE ENGINE

(71) Applicant: United Technologies Corporation, Farmington, CT (US)

(72) Inventors: Christina G. Ciamarra, Kittery, ME (US); Hannah M. Pier, Dover, NH (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 109 days.

(21) Appl. No.: 15/813,083

(22) Filed: Nov. 14, 2017

(65) Prior Publication Data

US 2019/0145272 A1  May 16, 2019

(51) Int. Cl.
*F01D 11/08* (2006.01)
*F01D 25/12* (2006.01)

(52) U.S. Cl.
CPC .............. *F01D 11/08* (2013.01); *F01D 25/12* (2013.01); *F05D 2240/55* (2013.01); *F05D 2250/74* (2013.01); *F05D 2260/202* (2013.01)

(58) Field of Classification Search
CPC ...... F01D 11/08; F01D 25/12; F05D 2240/55; F05D 2260/202
See application file for complete search history.

(56) References Cited

U.S. PATENT DOCUMENTS

| | | | |
|---|---|---|---|
| 8,707,712 B2 * | 4/2014 | Spangler | F01D 25/12 415/115 |
| 2016/0201467 A1 | 7/2016 | Milligan et al. | |
| 2017/0044931 A1 | 2/2017 | Lutjen et al. | |
| 2017/0198599 A1 | 7/2017 | Ryan et al. | |
| 2017/0198603 A1 | 7/2017 | Ryan et al. | |

\* cited by examiner

*Primary Examiner* — Moshe Wilensky
*Assistant Examiner* — Andrew Thanh Bui
(74) *Attorney, Agent, or Firm* — Cantor Colburn LLP

(57) ABSTRACT

A blade outer air seal for a gas turbine engine is provided. The blade outer air seal having: a gas path surface exposed to exhaust gas flow; a first side extending radially outward from the gas path surface; a second side extending radially outward from the gas path surface; and a plurality of film cooling holes disposed on at least one of the gas path surface, the first side and the second side, the film cooling holes disposed at locations described by a set of Cartesian coordinates set forth in Table 1, the Cartesian coordinates provided by an axial coordinate, a circumferential coordinate and a radial coordinate relative to a defined point of origin.

17 Claims, 9 Drawing Sheets

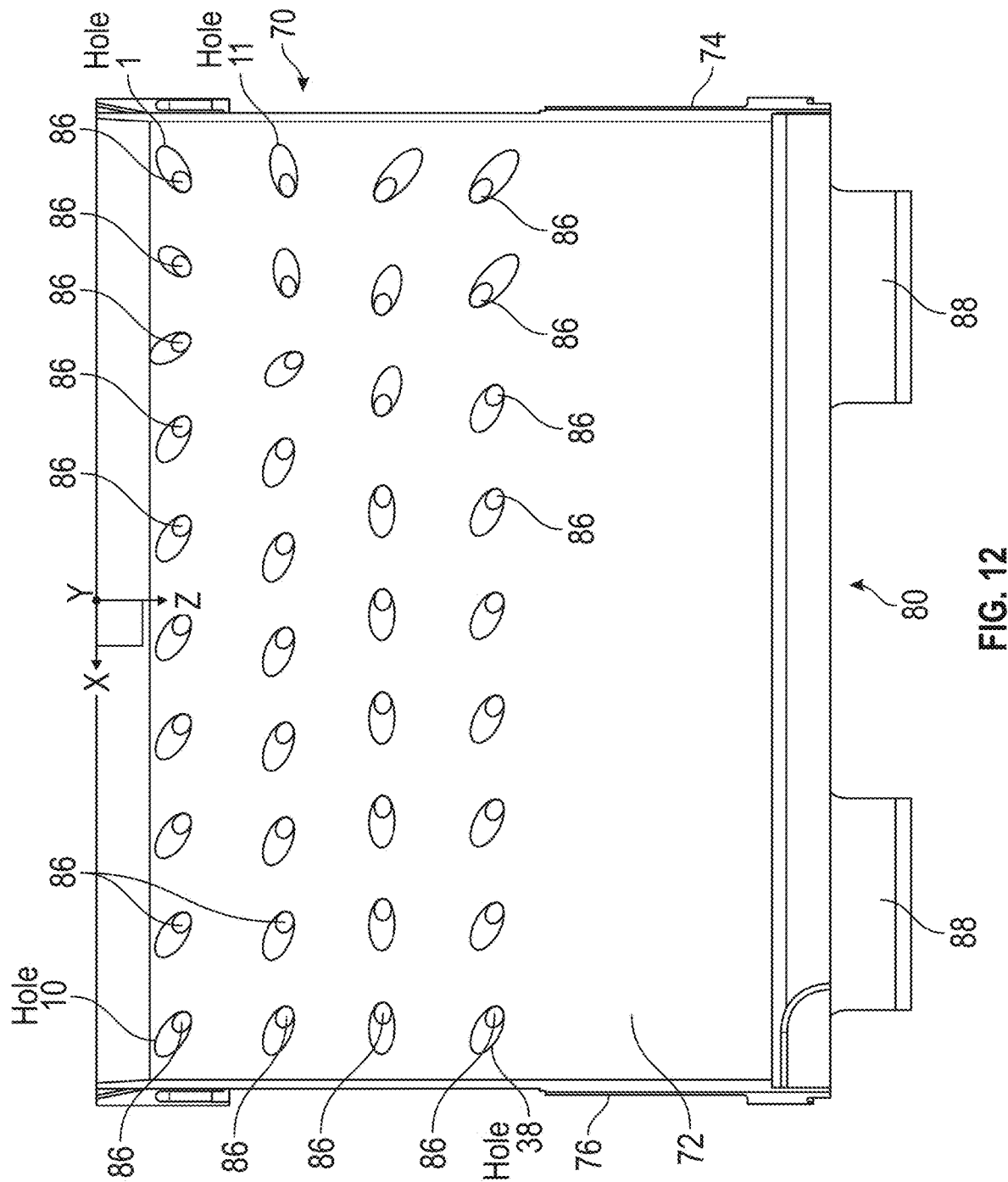

BLADE OUTER AIR SEAL FOR A GAS TURBINE ENGINE

BACKGROUND

The present disclosure relates to blade outer air seals (BOAS) for gas turbine engines, more particularly to BOAS for gas turbine engines with cooling holes defined therein.

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Both the compressor and turbine sections include rotating blades alternating between stationary vanes. The vanes and rotating blades in the turbine section extend into the flow path of the high-energy exhaust gas flow. Leakage around vanes and blades reduces efficiency of the turbine section. Blade outer air seals (BOAS) control leakage of gas flow and improve engine efficiency. All structures within the exhaust gas flow path are exposed to the extreme temperatures. A cooling air flow is therefore utilized over some structures to improve durability and performance.

As such blade outer air seals (BOAS) may be disposed in turbine sections of turbomachines for sealing the gap between a turbine blade tip and the inner wall of the turbomachine casing. In such uses, the BOAS can be exposed to extreme heat and can require cooling.

Accordingly, it is desirable to provide adequate cooling to the BOAS.

BRIEF DESCRIPTION

In one embodiment, a blade outer air seal for a gas turbine engine is provided. The blade outer air seal having: a gas path surface exposed to exhaust gas flow; a first side extending radially outward from the gas path surface; a second side extending radially outward from the gas path surface; and a plurality of film cooling holes disposed on at least one of the gas path surface, the first side and the second side, the film cooling holes disposed at locations described by a set of Cartesian coordinates set forth in Table 1, the Cartesian coordinates provided by an axial coordinate, a circumferential coordinate and a radial coordinate relative to a defined point of origin.

In addition to one or more of the features described above, or as an alternative to any of the foregoing embodiments, the blade outer air seal may have an axially forward side and an axially aft side, wherein the gas path surface and the forward side define an arc and the point of origin is defined at the center of curvature of the arc on the forward side.

In addition to one or more of the features described above, or as an alternative to any of the foregoing embodiments, the forward side and the aft side may include features for securement to a support structure within the turbine section of the gas turbine engine.

In addition to one or more of the features described above, or as an alternative to any of the foregoing embodiments, the blade outer air seal is one of a plurality of outer air seals disposed circumferentially about a longitudinal axis of the gas turbine engine.

In addition to one or more of the features described above, or as an alternative to any of the foregoing embodiments, wherein each of the film cooling air holes are located within a true position of 0.023 inches (0.58 mm).

In addition to one or more of the features described above, or as an alternative to any of the foregoing embodiments, wherein at least some of the film cooling air holes comprise one of a conical and cylindrical shape.

In addition to one or more of the features described above, or as an alternative to any of the foregoing embodiments, wherein each of the film cooling air holes correspond with a passage through the corresponding surface and at least some of the passages are disposed at an angle different than normal relative to the surface.

In addition to one or more of the features described above, or as an alternative to any of the foregoing embodiments, wherein the plurality of film cooling holes have a diameter within a range of 0.010-0.035 inches.

In yet another embodiment, a gas turbine engine is provided. The gas turbine engine having: a compressor section disposed about an axis; a combustor in fluid communication with the compressor section; a turbine section in fluid communication with the combustor, the turbine section includes at least one rotor having a plurality of rotating blades; and a plurality of blade outer air seals circumferentially surrounding the rotating blades, wherein at least one of the plurality of blade outer air seals includes: a gas path surface exposed to exhaust gas flow; a first side extending radially outward from the gas path surface; a second side extending radially outward from the gas path surface; and a plurality of film cooling holes disposed on at least one of the gas path surface, the first side and the second side, the film cooling holes disposed at locations described by a set of Cartesian coordinates set forth in Table 1, the Cartesian coordinates provided by an axial coordinate, a circumferential coordinate and a radial coordinate relative to a zero-coordinate.

In addition to one or more of the features described above, or as an alternative to any of the foregoing embodiments, wherein each of the plurality of blade outer air seals includes an axially forward side and an axially aft side, wherein the gas path surface and the forward side define an arc and the zero-coordinate is defined at the center of curvature of the arc on the forward side.

In addition to one or more of the features described above, or as an alternative to any of the foregoing embodiments, wherein the forward side and the aft side include features for securement to a support structure within the turbine section of the gas turbine engine.

In addition to one or more of the features described above, or as an alternative to any of the foregoing embodiments, wherein each of the plurality of film cooling air holes are located within a true position of 0.023 inches (0.58 mm).

In addition to one or more of the features described above, or as an alternative to any of the foregoing embodiments, wherein at least some of the plurality of film cooling air holes comprise one of a conical and cylindrical shape.

In addition to one or more of the features described above, or as an alternative to any of the foregoing embodiments, wherein each of the plurality of film cooling air holes are in communication with a corresponding plurality of passages and at least some of the passages are disposed at an angle different than normal relative to the surface.

In addition to one or more of the features described above, or as an alternative to any of the foregoing embodiments, wherein the plurality of film cooling holes have a diameter within a range of 0.010-0.035 inches.

In yet another embodiment, a plurality of blade outer air seals supported within a case of a gas turbine engine is provided. The plurality of blade outer air seals abutting each other to form a circumferential boundary radially outward of at least one stage of a turbine section of the gas turbine engine, wherein at least one of the plurality of blade outer air seals includes: a gas path surface exposed to exhaust gas flow; a first side extending radially outward from the gas path surface; a second side extending radially outward from the gas path surface; and a plurality of film cooling holes disposed on at least one of the gas path surface, the first side and the second side, the film cooling holes disposed at locations described by a set of Cartesian coordinates set forth in Table 1, the Cartesian coordinates provided by an axial coordinate, a circumferential coordinate and a radial coordinate relative to a zero-coordinate.

In addition to one or more of the features described above, or as an alternative to any of the foregoing embodiments, wherein each of the plurality of blade outer air seals includes an axially forward side and an axially aft side, wherein the gas path surface and the forward side define an arc and the zero-coordinate is defined at the center of curvature of the arc on the forward side.

In addition to one or more of the features described above, or as an alternative to any of the foregoing embodiments, wherein the forward side and the aft side include features for securement to a support structure within the turbine section of the gas turbine engine.

In addition to one or more of the features described above, or as an alternative to any of the foregoing embodiments, wherein each of the plurality of film cooling air holes are located within a true position of 0.023 inches (0.58 mm).

In addition to one or more of the features described above, or as an alternative to any of the foregoing embodiments, wherein at least some of the plurality of film cooling air holes comprise one of a conical and cylindrical shape.

BRIEF DESCRIPTION OF THE DRAWINGS

The following descriptions should not be considered limiting in any way. With reference to the accompanying drawings, like elements are numbered alike:

FIG. 12 is another side perspective view of a blade outer air seal (BOAS) in accordance with this disclosure;

DETAILED DESCRIPTION

Reference is made to the following U.S. Patent Publications, U.S. 2017/0198603; U.S. 2016/0201467; and US 2017/0044931 the contents each of which are incorporated herein by reference thereto. A detailed description of one or more embodiments of the disclosed apparatus and method are presented herein by way of exemplification and not limitation with reference to the Figures.

Figure 1:
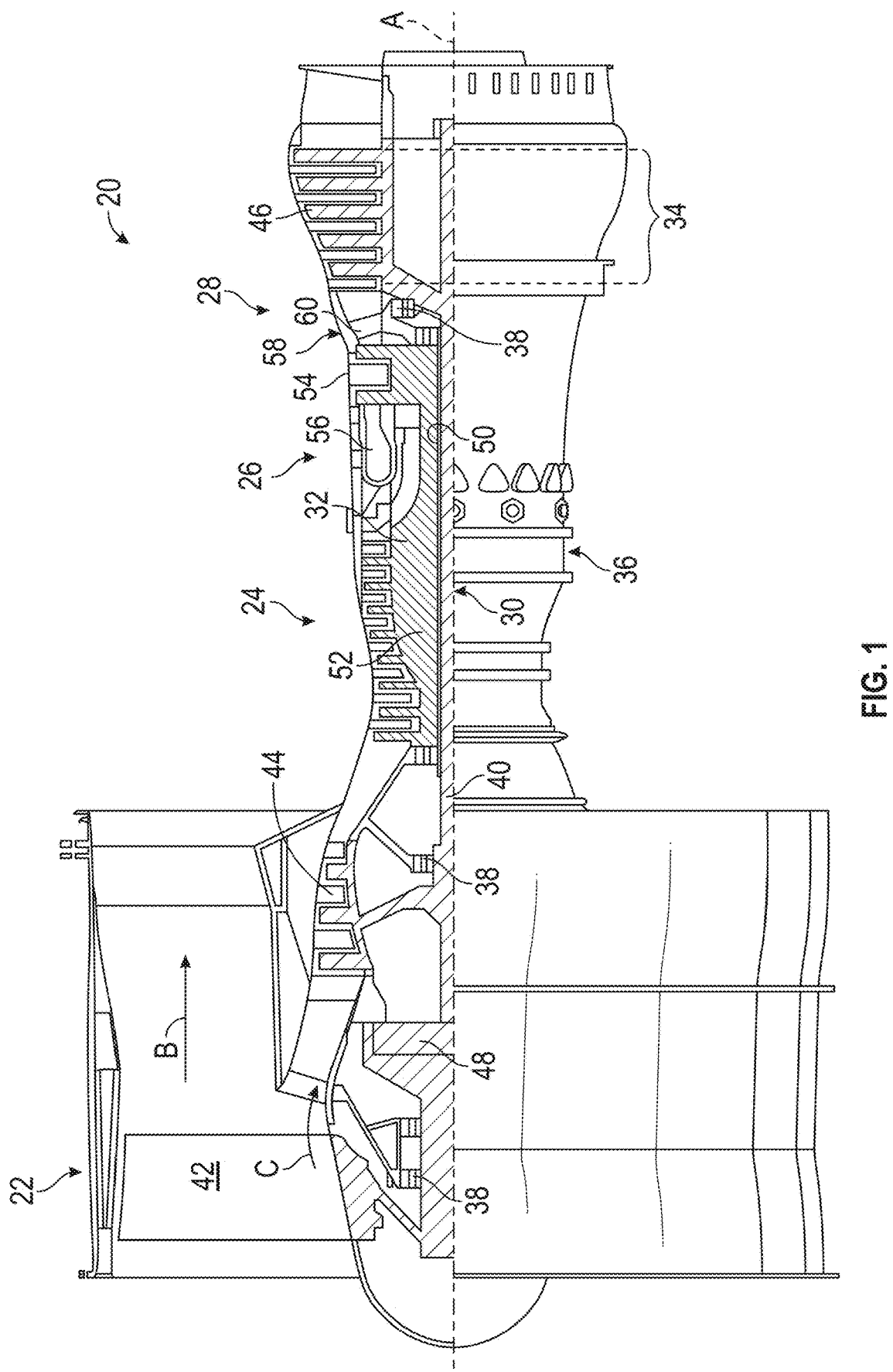
FIG. 1 is a schematic, partial cross-sectional view of a turbomachine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second (350.5 m/sec).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
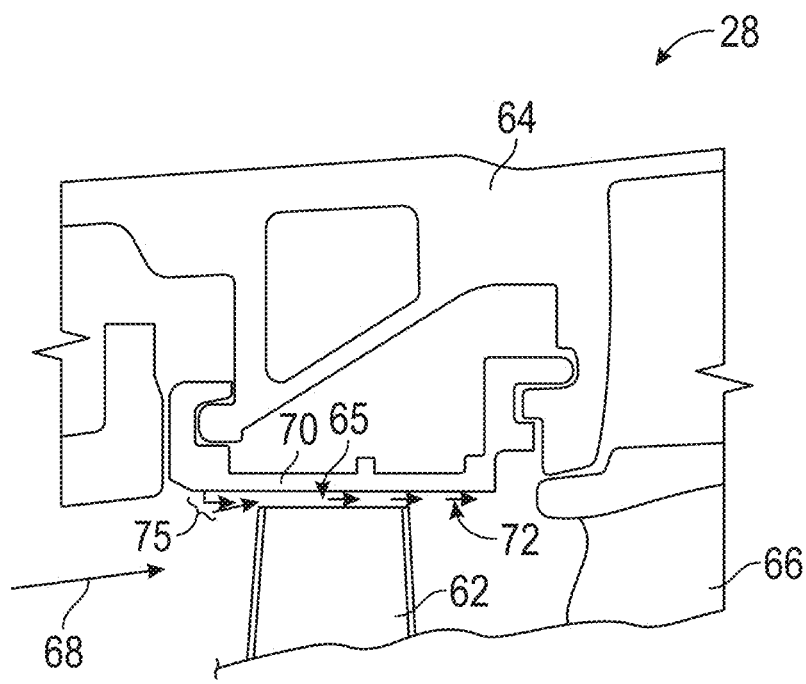
FIG. 2 is a schematic view of a portion of a turbine section of a gas turbine engine.

Referring to FIGS. 1 and 2, the example turbine section 28 includes at least one rotor 34 having a turbine blade 62. The turbine blade 62 includes a tip 65 disposed adjacent to a blade outer air seal 70 (BOAS). A stationary vane 66 is mounted and supported within the case 64 on at least one side of the turbine blade 62 for directing gas flow into the next turbine stage. The BOAS 70 is disposed adjacent to the tip 65 to provide a desired clearance between the tip 65 and a gas path surface 72 of the BOAS 70. The clearance provides for increase efficiency with regard to the extraction of energy from the high energy gas flow indicated by arrow 68.

The turbine blade 62 and vane 66 along with the blade outer air seal are exposed to the high-energy exhaust gas flow 68. The high energy exhaust gas flow 68 is at an elevated temperature and thereby structures such as the blade 62, vane 66 and the BOAS 70 are fabricated from materials capable of withstanding the extremes in temperature. Moreover, each of these structures may include provisions for generating a cooling film air flow 75 over the surfaces. The cooling film air flow generates a boundary layer that aids in survivability for the various structures within the path of the exhaust gasses 68.

In the disclosed example, a plurality of BOAS 70 are supported within the case 64 and abut each other to form a circumferential boundary radially outward of the tip 65. Accordingly, at least one stage of the turbine section 28 includes a plurality of BOAS 70 that define a radial clearance between the tip 65 and the gas path surface 72. Additional stages in the turbine section 28 will include additional BOAS to define the radial clearance with turbine blades of each stage.

Figure 3:
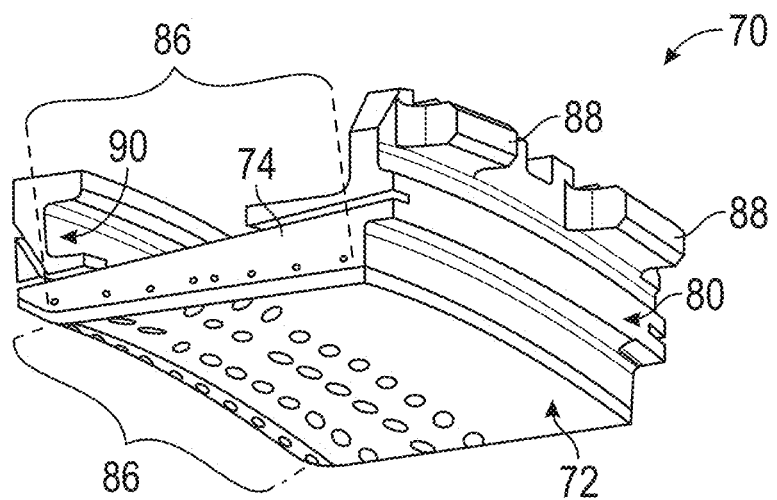
FIG. 3 is a perspective view of an example blade outer air seal.
Figure 4:
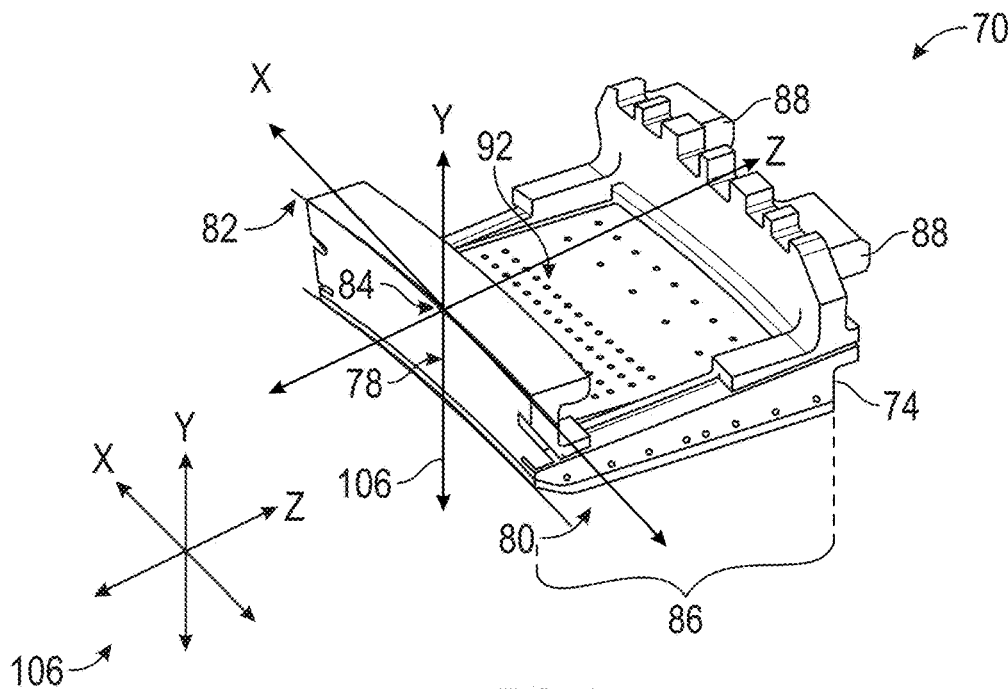
FIG. 4 is a another perspective view of the example blade outer air seal.

Referring to FIGS. 3 and 4 with continued reference to FIG. 2, the BOAS 70 includes a plurality of film cooling holes 86 for generating a film cooling air flow, indicated at 75 in FIG. 2, along the gas path surface 72. The film cooling holes 86 are disposed on surfaces exposed to the exhaust gasses 68. It should be understood that the term "holes" is used by way of description and not intended to limit the shape to a round opening. Accordingly, the example holes 86 maybe round, oval, square or any other shape desired.

Figure 5:
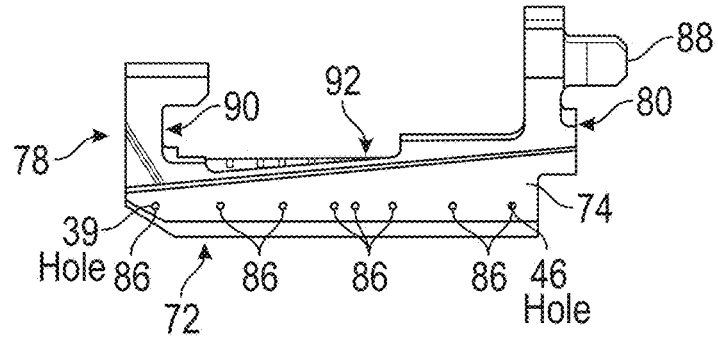
FIG. 5 is a first side view of an example blade outer air seal.
Figure 6:
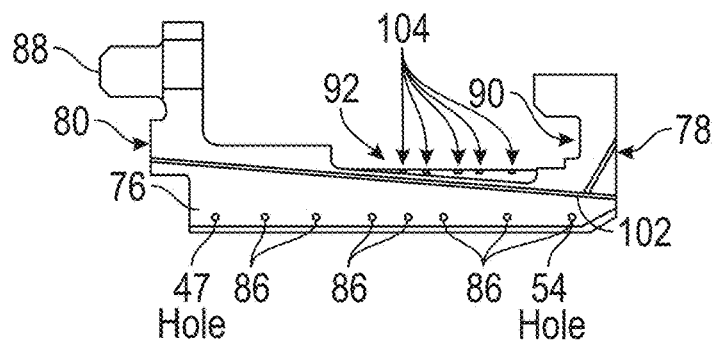
FIG. 6 is a second side view of an example blade outer air seal.

Referring to FIGS. 5 and 6 with continued reference to FIGS. 3 and 4, the example BOAS 70 includes the gas path surface 72 that is exposed directly to the exhaust gasses 68. The BOAS 70 further includes a first side 74 and a second side 76. The first and second sides 74, 76 abut adjacent BOASs disposed circumferentially about the turbine case 64. Each of the BOASs 70 includes a forward surface 78 and an aft surface 80. The forward surface 78 and aft surface 80 includes support features for holding each BOAS within the turbine case 64. In this example, the BOAS 70 includes a forward channel 90 and an aft tab 88 to conform to features within the turbine cases 64 to support the BOAS 70 circumferentially about the corresponding turbine blade 62.

The first side 74 and second side 76 and a gas path surface 72 all include a plurality of film cooling holes 86. Each of the film cooling holes 86 provide a pathway for cooling air to generate the boundary layer of cooling air flow 75 to maintain the BOAS within defined temperature ranges. A specific location of the film cooling holes 86 is devised to provide cooling air flow coverage of features susceptible to the high temperature exhaust gasses. The cooling holes 86 are arranged to produce boundary layers of cooling flow along the gas path surface 72 along with the first side 74 and the second side 76. As appreciated, the first side and second side provide the cooling air holes 86 to inject cooling flow between adjacent blade outer air seals 70.

The location of the cooling holes 86 are described in terms of Cartesian coordinates indicated by the axes 106 that includes X, Y and Z axes which correspond to the radial direction (Y), the circumferential direction (X), and the axial direction (Z) as is shown in FIG. 4 relative to a point of origin indicated at 84. The locations for the cooling holes 86 correspond to the location where the holes break through the surface of either the first side 74, the second 76 or the gas path surface 72.

The coordinates of the cooling holes are set forth in Table 1 (shown below), provide for the circumferential, radial and axial location relative to the point of origin 84 on the BOAS 70. Each row in Table 1 corresponds with a center line location of an individual hole on one of the first side 74, second side 76 and the gas path surface 72. The units of measurement in Table 1 are in inches. In an alternative embodiment, Table 1 may include non-dimensional locations relative to the point of origin 84. The point of origin 84 is disposed on an arc 82 of the forward surface 78. The point of origin 84 is disposed at the center of curvature 80 that defines the circumferential radius of the plurality of BOAS around the specific turbine rotor section.

TABLE 1

| Hole # | X | Y | Z |
|---|---|---|---|
| 1 | −0.7615 | −0.4841 | 0.1395 |
| 2 | −0.6024 | −0.4701 | 0.1431 |
| 3 | −0.4526 | −0.4614 | 0.1348 |
| 4 | −0.2937 | −0.4542 | 0.1391 |
| 5 | −0.1172 | −0.4498 | 0.1391 |
| 6 | 0.0593 | −0.4492 | 0.1391 |
| 7 | 0.2358 | −0.4524 | 0.1391 |
| 8 | 0.4121 | −0.4593 | 0.1391 |
| 9 | 0.5883 | −0.4699 | 0.1391 |
| 10 | 0.7643 | −0.4843 | 0.1391 |
| 11 | −0.7556 | −0.4835 | 0.3315 |
| 12 | −0.5757 | −0.4690 | 0.3353 |
| 13 | −0.4173 | −0.4595 | 0.3353 |
| 14 | −0.2559 | −0.4530 | 0.3247 |
| 15 | −0.0867 | −0.4495 | 0.3247 |
| 16 | 0.0826 | −0.4494 | 0.3247 |
| 17 | 0.2519 | −0.4528 | 0.3247 |
| 18 | 0.4210 | −0.4597 | 0.3247 |
| 19 | 0.5900 | −0.4700 | 0.3247 |
| 20 | 0.7587 | −0.4838 | 0.3247 |
| 21 | −0.7475 | −0.4828 | 0.5232 |
| 22 | −0.5452 | −0.4669 | 0.5093 |
| 23 | −0.3646 | −0.4570 | 0.5093 |
| 24 | −0.1695 | −0.4507 | 0.5040 |
| 25 | 0.0157 | −0.4490 | 0.5040 |
| 26 | 0.2009 | −0.4514 | 0.5040 |
| 27 | 0.3860 | −0.4580 | 0.5040 |
| 28 | 0.5709 | −0.4687 | 0.5040 |
| 29 | 0.7554 | −0.4835 | 0.5040 |
| 30 | −0.7475 | −0.4828 | 0.6932 |
| 31 | −0.5629 | −0.4681 | 0.6932 |
| 32 | −0.3498 | 0.4564 | 0.6924 |
| 33 | −0.1647 | −0.4506 | 0.6924 |
| 34 | 0.0204 | −0.4490 | 0.6924 |
| 35 | 0.2056 | −0.4516 | 0.6924 |
| 36 | 0.3907 | −0.4582 | 0.6924 |
| 37 | 0.5756 | −0.4690 | 0.6924 |
| 38 | 0.7602 | −0.4839 | 0.6924 |
| 39 | −0.8599 | −0.4380 | 0.1227 |
| 40 | −0.8599 | −0.4380 | 0.3018 |
| 41 | −0.8599 | −0.4380 | 0.4511 |
| 42 | −0.8599 | −0.4380 | 0.6011 |
| 43 | −0.8599 | −0.4380 | 0.6793 |
| 44 | −0.8599 | −0.4380 | 0.8000 |
| 45 | −0.8599 | −0.4380 | 0.9573 |

TABLE 1-continued

| Hole # | X | Y | Z |
|---|---|---|---|
| 46 | −0.8599 | −0.4380 | 1.1191 |
| 47 | 0.8599 | −0.4380 | 1.0478 |
| 48 | 0.8599 | −0.4380 | 0.8800 |
| 49 | 0.8599 | −0.4380 | 0.7618 |
| 50 | 0.8599 | −0.4380 | 0.6400 |
| 51 | 0.8599 | −0.4380 | 0.5600 |
| 52 | 0.8599 | −0.4380 | 0.4989 |
| 53 | 0.8599 | −0.4380 | 0.4018 |
| 54 | 0.8599 | −0.4380 | 0.2604 |

Each location set forth in Table 1 is where the center line of each cooling hole 86 breaks through the surface. In alternative embodiments, additional elements such as protective coatings, and other specific features may be provided in the BOAS 70. In addition and in alternative embodiments, additional cooling holes may be provided in the BOAS.

Manufacturing tolerances are recognized for the fabrication of BOAS 70. Moreover, each hole may deviate from a true position with a tolerance of about 0.023 inches (0.58 mm) from a center line of the hole. The specific tolerance is with regard to the location of each of the holes and generally not scalable. However and in an alternative embodiment wherein the coordinates provided in the table are non-dimensional they may be scalable relative to the sizes of the blade outer air seal.

Figure 7:
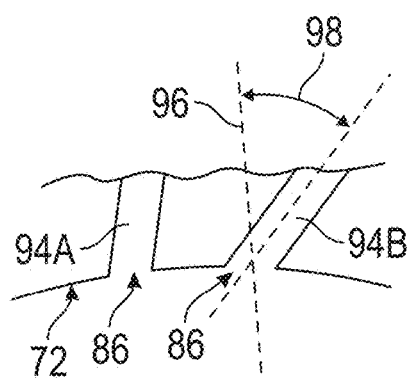
FIG. 7 is a schematic view through a film cooling hole.

Referring to FIG. 7, with continued reference to FIGS. 3, 4, 5 and 6, each of the holes 86 is in communication with at least one passage such as those indicated at 94a and 94b. The passages 94a and 94b communicate cooling air flow from a supply in communication with openings beneath component 92 of each BOAS 70. In this example as is shown in FIG. 6, several passages 102 are provided through the BOAS 70 to communicate cooling air flow to the film cooling holes 86.

At least one of the passages, for example passage 94b is disposed at an angle 98 relative to normal 96 to the corresponding surface for that opening 86. Some of the passages, for example passage 94A may be disposed normal to the surface through which the opening extends.

Figure 8A:
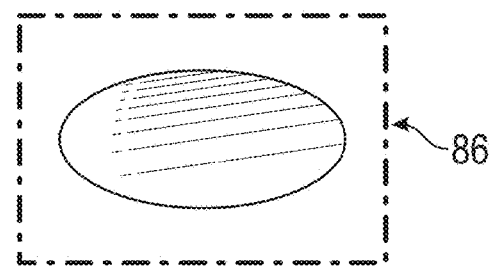
FIG. 8A is a schematic view of a film cooling hole.
Figure 8B:
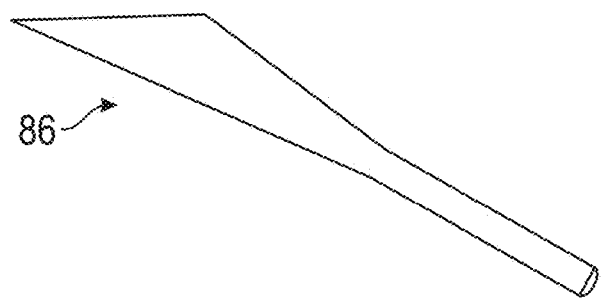
FIG. 8B is a cross-section schematic view of the film cooling hole of FIG. 8A.

Referring to FIGS. 8A and 8B, the holes may include a conical shape corresponding to a generally oblong opening through the surface. This oblong opening provides a direction of air flow once it exits the holes 86 to provide the desired flow pattern for cooling air flow. Moreover, the holes 86 may be cylindrically shaped.

Figure 9:
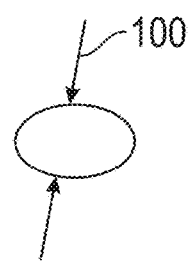
FIG. 9 is a schematic view of an example film cooling hole.
Figure 10:
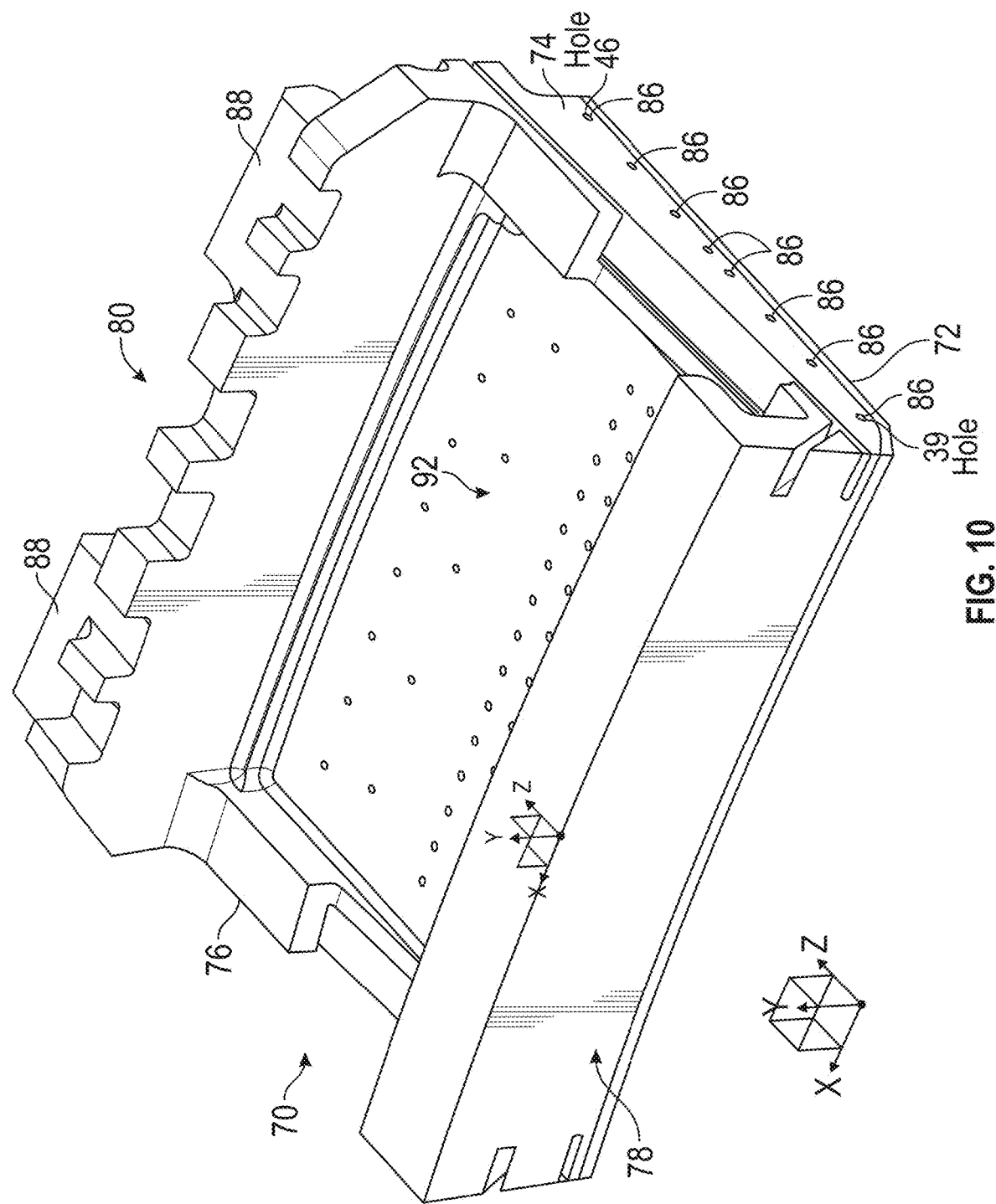
FIG. 10 is a perspective view of a blade outer air seal (BOAS) in accordance with this disclosure.

Referring to at least FIG. 9, 10 and FIG. 12, each of the openings generally include a diameter 100 that is measured at least the largest portion of the opening and the size of the opening or hole may vary depending upon the surface it is located on. For example, holes 86 that are located on the first side 74 and the second side 76 are in one embodiment within a range of 0.010-0.035 inches in diameter and holes located on the gas path surface 72 are in one embodiment within a range of 0.010-0.035 inches.

Referring back to FIGS. 3, 4 and Table 1, the location of each film cooling hole 86 is defined according to the table in the circumferential (X), axial (Y) and radial direction relative to the zero point 84. The locations are not directional, meaning they indicate a center line of the opening regardless of the orientation of the surface through which it extends. Accordingly, Table 1 defines locations of openings on each of the first and second sides 74, 76 that are substantially transverse to the gas path surface 72. As mentioned above, the units used in Table 1 are inches.

The locations are presented in Table 1 in cold, coated, and stationary condition and are subject to change based on finishing of the BOAS 70. The coordinates are normalized. One having ordinary skill in the art will appreciate that new locations of cooling holes 86 relative to any suitable reference can be determined in any suitable manner based on the procedures involved in finishing the BOAS 70. Holes 86 are located with included part tolerances and a hole true position of about 0.023 inches or 0.58 mm. As described herein, holes 86 can include any suitable cross-sectional shape, such as, but not limited to, circular, elliptical, and/or any other symmetric or non-symmetric shape.

Alternatively, substantial conformance is based on a determination by a national or international regulatory body, for example in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified airfoil, blade, or vane, or that the part or structure is sufficiently the same with respect to a part design in a type-certified or type-certificated BOAS, such that the part or structure complies with airworthiness standards applicable to the specified blade, vane or airfoil. In particular, substantial conformance encompasses any regulatory determination that a particular part or structure is sufficiently similar to, identical to, or the same as a specified BOAS, such that certification or authorization for use is based at least in part on the determination of similarity.

Figure 11:
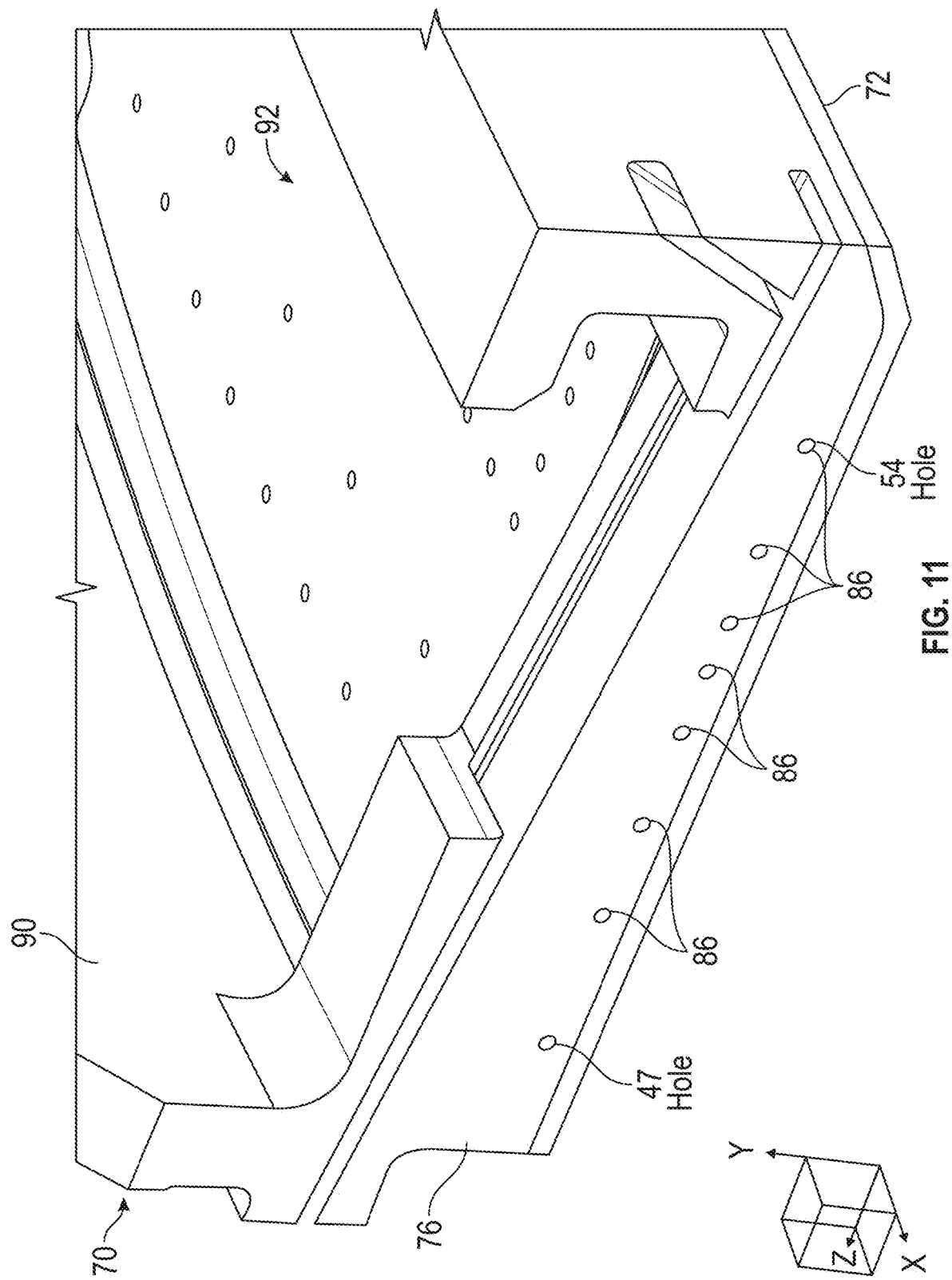
FIG. 11 is side perspective view of a blade outer air seal (BOAS) in accordance with this disclosure.
Figure 13A:
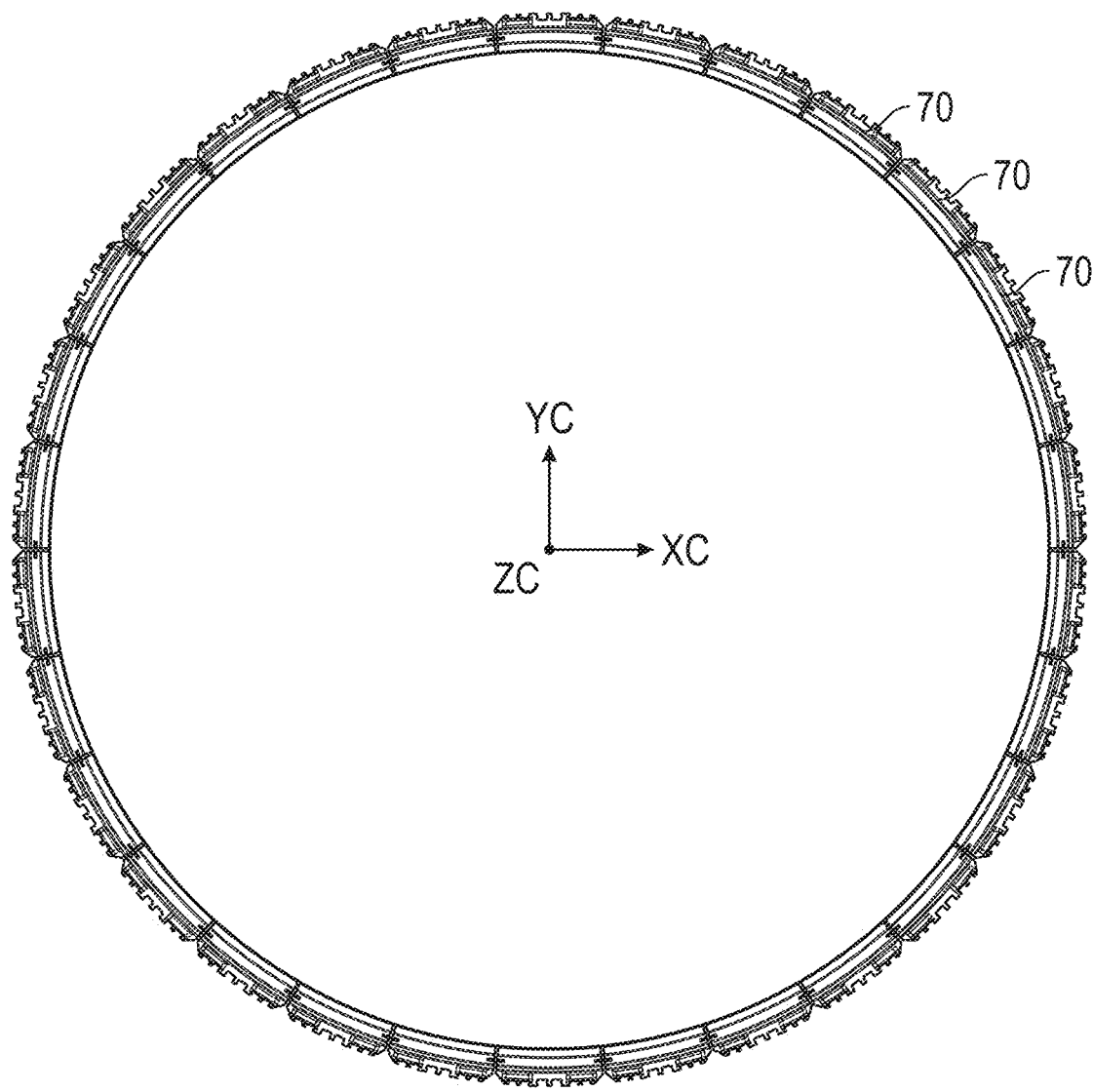
FIG. 13A is a view aft view illustrating a plurality of blade outer air seals (BOAS) adjacent to each other.
Figure 13B:
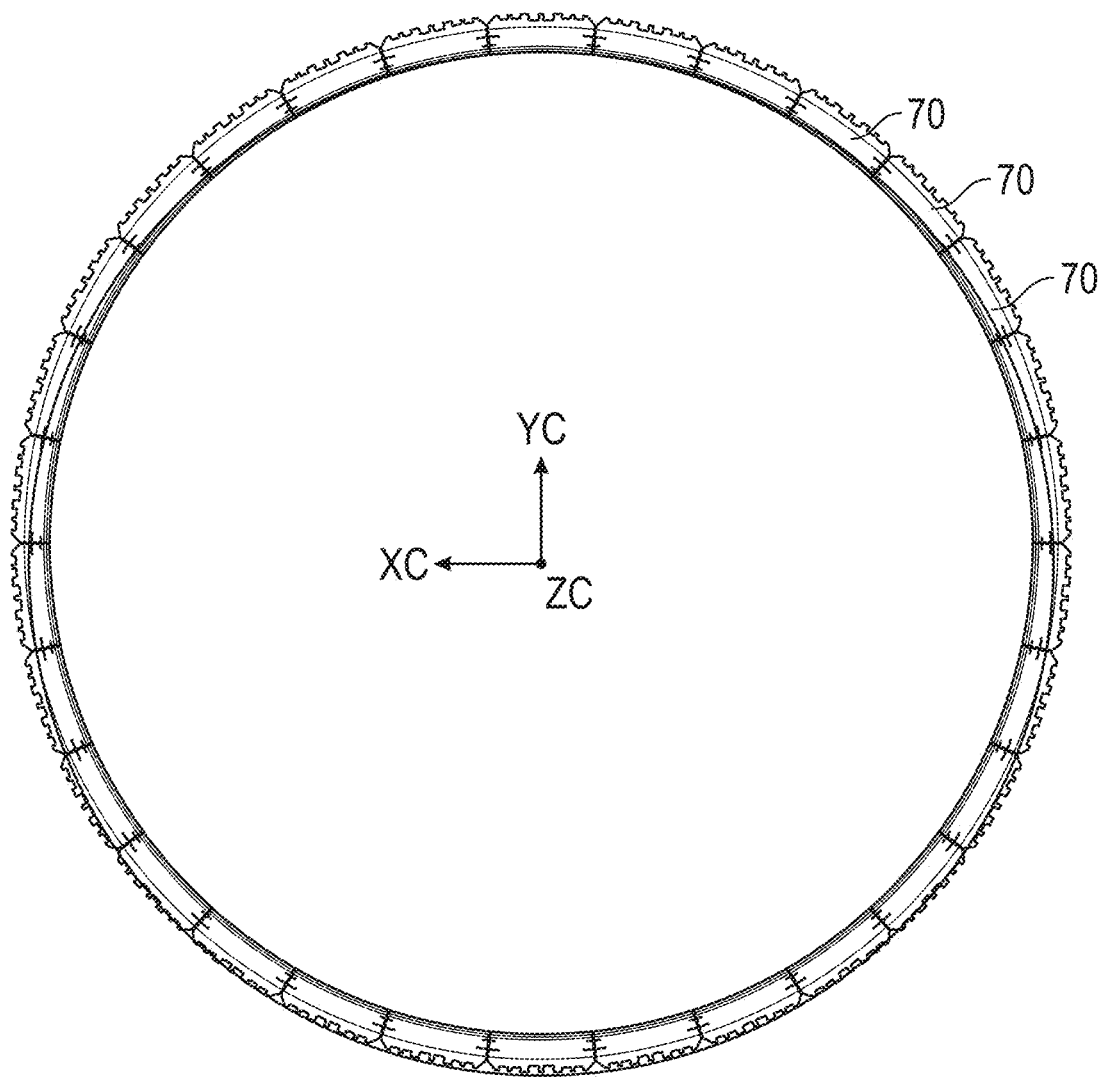
FIG. 13B is a forward view of the plurality of blade outer air seals (BOAS) illustrated in FIG. 13A.

Referring now to FIGS. 10-12, a BOAS 70 formed with cooling holes 86 in accordance with Table 1 is illustrated. BOAS 70 is intended to be used with a plurality of other BOAS 70 in a gas turbine engine 20. See for example FIGS. 13A and 13B, which illustrates a plurality of BOAS 70 illustrated as being side by side. When installed into engine 20 the BOAS 70 will be configured to be arranged circumferentially about the axis A of the engine and in some embodiments about the turbine blades 62 of the engine 20. FIG. 13A is an aft view illustrating a plurality of blade outer air seals (BOAS) adjacent to each other and FIG. 13B is a forward view of the plurality of blade outer air seals (BOAS) illustrated in FIG. 13A. As used herein, aft view is right to left with respect to FIG. 1 and forward view is left to right with respect to FIG. 1.

As illustrated in at least FIGS. 10-12, the BOAS 70 includes a plurality of film cooling holes 86 for generating a film cooling air flow. The film cooling holes 86 are disposed on surfaces exposed to the exhaust gasses 68. It should be understood that the term "holes" is used by way of description and not intended to limit the shape to a round opening. Accordingly, the example holes 86 maybe round, oval, square or any other shape desired.

The BOAS 70 also includes a gas path surface 72 that is exposed directly to the exhaust gasses 68. The BOAS 70 further includes a first side 74 and a second side 76. The first and second sides 74, 76 abut adjacent BOASs disposed circumferentially about the turbine case 64. Each of the BOASs 70 includes a forward surface 78 and an aft surface 80. The forward surface 78 and aft feature 88 includes support features for holding each BOAS within the turbine case 64. In this example, the BOAS 70 includes a forward channel 90 and an aft tab 88 to conform to features within the turbine cases 64 to support the BOAS 70 circumferentially about the corresponding turbine blade 62.

The first side 74 and second side 76 and a gas path surface 72 all include a plurality of film cooling holes 86. Each of the film cooling holes 86 provide a pathway for cooling air to generate the boundary layer of cooling air flow 75 to maintain the BOAS within defined temperature ranges. A specific location of the film cooling holes 86 is devised to provide cooling air flow coverage of features susceptible to the high temperature exhaust gasses. The cooling holes 86 are arranged to produce boundary layers of cooling flow along the gas path surface 72 along with the first side 74 and the second side 76. As appreciated, the first side and second side provide the cooling air holes 86 to inject cooling flow between adjacent blade outer air seals 70.

The location of the cooling holes 86 are described in terms of Cartesian coordinates indicated by the axes 106 that includes X, Y and Z axes which correspond to the radial direction (Y), the circumferential direction (X), and the axial direction (Z) as is shown in FIG. 4 as well as FIGS. 10 and 11 relative to a point of origin indicated at 84. The locations for the cooling holes 86 correspond to the location where the holes break through the surface of either the first side 74, the second 76 76 and/or the gas path surface 72.

The coordinates of the cooling holes for BOAS 70 are set forth in Table 1 (shown above), these coordinates provide for the circumferential, radial and axial location relative to the point of origin 84 on the BOAS 70. As mentioned above each row in Table 1 corresponds with a center line location of an individual hole on one of the first side 74, second side 76 and the gas path surface 72. In this example, the point of origin 84 is disposed on an arc 82 of the forward surface 78. The point of origin 84 is disposed at the center of curvature 80 that defines the circumferential radius of the plurality of BOAS around the specific turbine rotor section.

As mentioned above, a gas turbine engine can include a first turbine section with a plurality of BOAS 70 each having a plurality of cooling holes in substantial conformance with the set of Cartesian coordinates set forth in Table 1.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A blade outer air seal for a gas turbine engine comprising:
   a gas path surface exposed to exhaust gas flow;
   a first side extending radially outward from the gas path surface;
   a second side extending radially outward from the gas path surface;
   an axially forward side and an axially aft side; and
   a plurality of film cooling holes disposed on the gas path surface, the first side and the second side, the film cooling holes disposed at locations described by a set of Cartesian coordinates set forth in Table 1, the Cartesian coordinates provided by an axial coordinate, a circumferential coordinate and a radial coordinate relative to a defined point of origin, wherein the point of origin is disposed on an arc of the forward side and the point of origin is disposed at a midpoint of the arc.

2. The blade outer air seal as recited in claim 1, wherein the forward side and the aft side include features that secure the blade outer air seal to a support structure within a turbine section of the gas turbine engine when the blade outer air seal is located within the turbine section of the gas turbine engine.

3. The blade outer air seal as recited in claim 1, the blade outer air seal is one of a plurality of outer air seals disposed circumferentially about a longitudinal axis of the gas turbine engine.

4. The blade outer air seal as recited in claim 1, wherein each of the film cooling air holes are located within a true position of 0.023 inches (0.58 mm).

5. The blade outer air seal as recited in claim 1, wherein at least some of the film cooling air holes comprise one of a conical and cylindrical shape.

6. The blade outer air seal as recited in claim 1, wherein each of the film cooling air holes are in communication with a passage that is in communication with cooling air flow and at least some of the passages are disposed at an angle different than normal relative to the surface.

7. The blade outer air seal as recited in claim 1, wherein the plurality of film cooling holes have a diameter within a range of 0.010-0.035 inches.

8. A gas turbine engine comprising:
   a compressor section disposed about an axis;
   a combustor in fluid communication with the compressor section;
   a turbine section in fluid communication with the combustor, the turbine section includes at least one rotor having a plurality of rotating blades; and
   a plurality of blade outer air seals circumferentially surrounding the rotating blades, wherein at least one of the plurality of blade outer air seals includes:
   a gas path surface exposed to exhaust gas flow;
   a first side extending radially outward from the gas path surface; a second side extending radially outward from the gas path surface;
   an axially forward side and an axially aft side; and
   a plurality of film cooling holes disposed on the gas path surface, the first side and the second side, the film cooling holes disposed at locations described by a set of Cartesian coordinates set forth in Table 1, the Cartesian coordinates provided by an axial coordinate, a circumferential coordinate and a radial coordinate relative to a zero-coordinate, wherein the zero-coordinate is disposed on an arc of the forward side and the zero coordinate is disposed at a midpoint of the arc.

9. The gas turbine engine as recited in claim 8, wherein the forward side and the aft side include features that secure the blade outer air seal to a support structure within the turbine section of the gas turbine engine when the blade outer air seal is located within the turbine section of the gas turbine engine.

10. The gas turbine engine as recited in claim 8, wherein each of the plurality of film cooling air holes are located within a true position of 0.023 inches (0.58 mm).

11. The gas turbine engine as recited in claim 8, wherein at least some of the plurality of film cooling air holes comprise one of a conical and cylindrical shape.

12. The gas turbine engine as recited in claim 8, wherein each of the plurality of film cooling air holes are in communication with a corresponding plurality of passages that are in communication with cooling air flow and at least some of the passages are disposed at an angle different than normal relative to the surface.

13. The gas turbine engine as recited in claim 8, wherein the plurality of film cooling holes have a diameter within a range of 0.010-0.035 inches.

14. A plurality of blade outer air seals supported within a case of a gas turbine engine and abutting each other to form a circumferential boundary radially outward of at least one stage of a turbine section of the gas turbine engine, wherein at least one of the plurality of blade outer air seals includes:
   a gas path surface exposed to exhaust gas flow;
   a first side extending radially outward from the gas path surface;
   a second side extending radially outward from the gas path surface;
   an axially forward side and an axially aft side; and
   a plurality of film cooling holes disposed on the gas path surface, the first side and the second side, the film cooling holes disposed at locations described by a set of Cartesian coordinates set forth in Table 1, the Cartesian coordinates provided by an axial coordinate, a circumferential coordinate and a radial coordinate relative to a zero-coordinate, wherein the zero-coordinate is disposed on an arc of the forward side and the zero-coordinate is disposed at a midpoint of the arc.

15. The plurality of blade outer air seals as recited in claim 14, wherein the forward side and the aft side include features that secure the blade outer air seal to a support structure within the turbine section of the gas turbine engine when the blade outer air seal is located within the turbine section of the gas turbine engine.

16. The plurality of blade outer air seals as recited in claim 14, wherein each of the plurality of film cooling air holes are located within a true position of 0.023 inches (0.58 mm).

17. The plurality of blade outer air seals as recited in claim 14, wherein at least some of the plurality of film cooling air holes comprise one of a conical and cylindrical shape.

* * * * *